United States Patent

Comfort

[11] Patent Number: 5,112,546
[45] Date of Patent: May 12, 1992

[54] METHOD OF CONTROLLING THICKNESS OF THERMOPLASTIC EXTRUDED PROFILE

[76] Inventor: Gordon A. Comfort, 6408 Rogers Hwy., Tecumseh, Mich. 49286

[21] Appl. No.: 698,286

[22] Filed: May 10, 1991

[51] Int. Cl.$^5$ ............................................. B29C 47/20
[52] U.S. Cl. .................... 264/167; 264/40.5; 264/40.7; 264/508; 425/145; 425/380; 425/465; 425/396
[58] Field of Search ...... 264/176.1, 167, 541, 264/508, 40.5, 40.7, 177.16; 425/466, 465, 382.3, 381, 145, 396, 380

[56] References Cited

U.S. PATENT DOCUMENTS

| | | | |
|---|---|---|---|
| 3,148,231 | 9/1964 | Spencer | 425/282.3 |
| 3,275,728 | 9/1966 | Martino | 264/541 |
| 3,280,847 | 10/1966 | Chisholm et al. | 138/121 |
| 3,420,926 | 1/1969 | Mason et al. | 264/167 |
| 3,674,404 | 7/1972 | Burlis et al. | 425/381 |
| 3,723,218 | 3/1973 | Gaffney | 264/167 |
| 4,209,476 | 6/1980 | Harris | 425/145 |
| 4,717,326 | 1/1988 | Motonaga et al. | 425/466 |

FOREIGN PATENT DOCUMENTS

| | | | |
|---|---|---|---|
| 47-47095 | 11/1972 | Japan | 264/167 |
| 62-116112 | 5/1987 | Japan | 264/541 |

Primary Examiner—Jeffery Thurlow
Attorney, Agent, or Firm—Bertram F. Claeboe

[57] ABSTRACT

A process is described for precisely controlling the thickness of a thermoplastic extruded profile by varying the output of a continuously operating extrusion die. The process employs an ancillary device preferably taking the form of accumulator means connected to an extrusion die, or to a passageway communicating with the die. The accumulator means functions as a variable volume device, and by action of cylinder-piston structure or the equivalent thereof, is effective to either receive or discharge melted thermoplastic resin as the exemplary working medium. In this manner, the accumulator means receives melt from the stream when the die output needs to be reduced, and delivers melt to the stream when the die output needs to be increased. Various illustrative structural arrangements are disclosed for accomplishing the process concepts of the present invention.

8 Claims, 2 Drawing Sheets

METHOD OF CONTROLLING THICKNESS OF THERMOPLASTIC EXTRUDED PROFILE

BACKGROUND OF THE INVENTION

It is known in the plastic extrusion art that the end use of the finished product may dictate that predetermined portions of the product have thickness variations therein. Illustratively, in the production of corrugated thermoplastic tubing or tile for drainage and water flow systems, structural integrity in the finished profile may dictate that the wall thickness of the ribs be relatively greater than the wall thickness of the valleys therebetween. Accomplishment of this objective under manufacturing conditions is often difficult, wherein there exists steady state conditions of constant melt output from an extruder or constant speed melt pump, and a corrugator operating at constant speed. Such conditions frequently produce corrugated tubing in which the plastic forming the rib is relatively thinner than the plastic of the inner diameter or valley, presumably because the plastic in the latter location has been stretched to the larger diameter.

Attempts have been made to overcome this problem by varying the proportions of the rib and valley, both longitudinally and diametrally, and by periodic variations in the operating speed of the corrugator. Although the intent of this pursuit was to permit more plastic to be directed into the ribbed portion of the profile, under normal manufacturing conditions this result has not been universally achieved.

SUMMARY OF THE INVENTION

Applicant has discovered that the thickness of a thermoplastic extruded profile may be precisely controlled by varying the output of a continuously operating extrusion die. This is accomplished by the present invention through provision of an ancillary device taking the form of accumulator means connected to an extrusion die, or to a passageway communicating with the die. The accumulator means functions in the manner of a variable volume device, and by actuation of piston means or the general equivalent thereof, is effective to either receive or discharge a working medium, exemplified herein by melted thermoplastic resin. In this manner, the accumulator means is effective by this invention to receive melt from the stream when the die output needs to be reduced, and to deliver melt to the stream when the die output needs to be increased. Thereby, the output of an otherwise essentially steady-state device is changed. Various illustrative structural arrangements for accomplishing these novel functions will be noted in detail as the description proceeds.

It has previously been proposed to employ an accumulator or reservoir in a plastic extrusion environment, and U.S. Pat. No. 3,706,827 issued Dec. 19, 1972 is generally illustrative thereof. In this disclosure a reservoir is used to provide plastic output to a die during a filter change. Continuous flow of plastic from the extruder is thus interrupted. However, by provision of the reservoir in this patent, the output from the die remains constant, and there is no change in the extruded profile.

DESCRIPTION OF A PREFERRED EMBODIMENT

Figure 1:
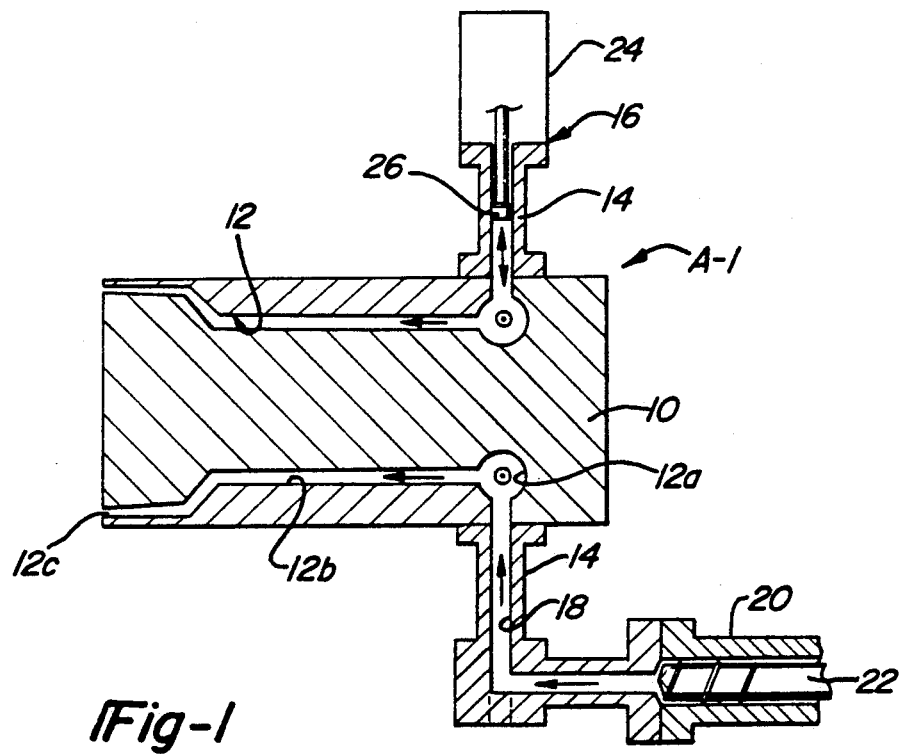
FIG. 1 is a vertical sectional view of an extrusion die, extruder, and accumulator means, illustrative of one location of the latter means in association with a bridgeless extrusion die.

Referring now to the drawings, and first to FIG. 1 thereof, designated generally by the legend A-1 is one form of plastic extrusion die flow control apparatus effective to practice the novel process concepts of the present invention. Apparatus A-1 comprises extrusion die member 10, illustratively of the bridgeless type, interiorly passaged generally at 12 to provide a toroidal portion 12a communicating with a substantially longitudinally directed annular portion 12b terminating in annular orifice portion 12c. Mounted upon the exterior of die member 10 is support member 14 formed to provide accumulator means 16 communicating with toroidal portion 12a of die passage 12. Support member 14 is additionally formed to provide interiorly thereof entrant passage 18 for melted plastic discharged from extruder 20 by action of feed screw means 22 therein. Accumulator means 16 may of course take various forms in practice of the present invention, and in the exemplary embodiment of FIG. 1, accurate control of die output or plastic flow through annular die orifice 12c is accomplished by employment of cylinder 24 and piston 26 movable therein in response to any of various control systems known to the art. An illustrative control system will be described hereinafter.

In operation of the embodiment of the invention shown in FIG. 1, and assuming by way of illustration that die member 10 is configured for the production of corrugated plastic tubing, the volume of melted plastic to assure that the rib portion of the tubing is structurally adequate is accurately controlled by activation of accumulator means 16. Piston means 26 within cylinder means 24 delivers into passage 12 through toroidal portion 12a an increased plastic volume to assure the desired rib formation. As can now be appreciated, when the piston means 26 advances in cylinder means 24, the pressure in the melt stream increases, and conversely, when the piston retracts, the pressure decreases. Likewise, when the piston is fully back, the melt stream pressure is substantially stable or generally normal.

In the embodiment of FIG. 1, and in the other forms of the invention to be later more fully described, plastic structures other than corrugated plastic tubing may be produced with accurate control over the wall thicknesses thereof. As for example, in a plastic container, the wall thickness in the shoulder portion thereof may be increased in accordance with the novel process concepts of this invention.

Figure 2:
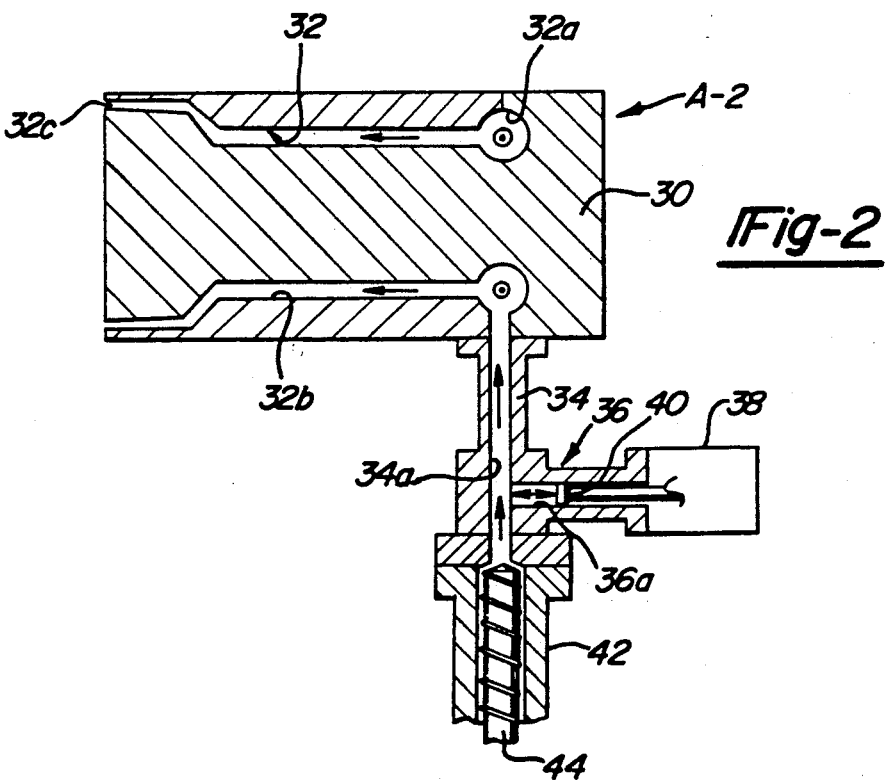
FIG. 2 is a view similar to FIG. 1, and showing another exemplary location of accumulator means in association with the same type die.

In applicant's method of controlling the thickness of a plastic extrusion by a variable output die, the variable volume device or accumulator means may receive or deliver melt directly from or to a mold cavity, as in the exemplary apparatus A-1 of FIG. 1, or by a merger with the feed stream, as in FIG. 2. In other words, the process concept of this invention may be effectively practiced with the accumulator at diverse locations.

Referring now to FIG. 2, there is shown another form of plastic extrusion die flow control apparatus, to which the legend A-2 has been generally applied. Apparatus A-2 comprises extrusion die member 30, again illustratively of the bridgeless type, passaged interiorly generally at 32 to provide a torus portion 32a in communication with a substantially longitudinally directed annular portion 32b, which terminates in an annular orifice portion 32c. Mounted upon the exterior of die member 30 is support member 34 axially passaged a 34a, and in the illustrative structure shown, integrally formed with accumulator means 36 axially passaged at 36a. The accumulator or variable volume device 36 is constructed to include cylinder means 38 and piston means 40 movable therein. Rigidly connected to the opposite end of support member 34 is extruder 42 having feed screw means 44 operable therein.

The method of operation of the exemplary structural embodiment shown in FIG. 2 is substantially as earlier described in connection with FIG. 1. Output of melted plastic through annular die orifice 32a is varied by action of accumulator means 36 coordinated through a suitable control system. Should an increased output through die orifice 32a be required, plastic melt within cylinder means 38 is discharged by action of piston means 40 through passage 36a into passage 34a, and therefrom into toroidal passage 32a in extrusion die member 30. In common with the embodiment of FIG. 1, the illustrative structure of FIG. 2 produces a continuously variable output at the die orifice in order to provide an ultimate plastic shape with differing wall thickness portions, whether it be corrugated plastic tubing, plastic containers, or other plastic articles. Under these circumstances, it is now contemplated that the accumulator means 16 or 36 will be in substantially continuous operation.

Figure 3:
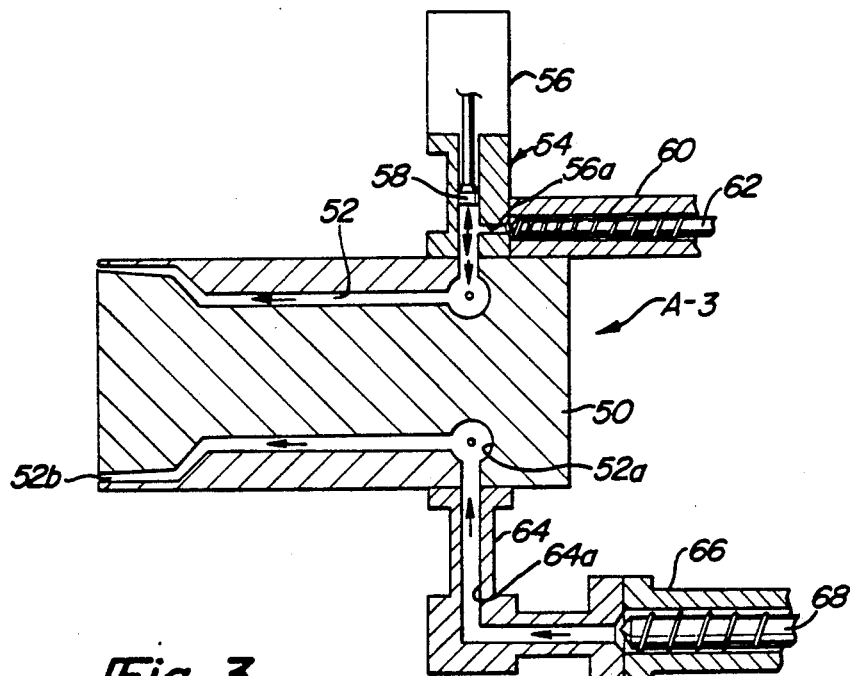
FIG. 3 is a view generally similar to the preceding views, but illustrative of another structural arrangement in which a secondary extruder is provided in association with accumulator means.

The process concept of the present invention can also be effectively practiced employing the illustrative structural arrangement of FIG. 3. As shown therein, plastic extrusion die flow control apparatus, designated generally by the legend A-3, is comprised of extrusion die member 50. Interiorly thereof, in generally the same manner as the die members of FIGS. 1 and 2, the die member 50 is provided with a substantially longitudinally disposed annular passage 52 communicating at opposite ends with a torus 52a and annular die orifice 52b. Mounted on the exterior of the extrusion die member 50 is accumulator means or variable volume device 54, which includes cylinder means 56 and piston means 58 movable therein. Structurally connected to the accumulator means 56 is secondary extruder 60 having feed screw means 62 operable therein. As shown, melt from extruder 60 flows into accumulator means 56 through radially directed passage 56a in the latter means which passage 56a connects with toroidal passage 52a and annular passage 52 leading to annular die orifice 52b.

Extrusion die member 50 on the exterior thereof also mounts support member 64 angularly passaged at 64a for receiving melt from extruder 66 having feed screw means 68 operable therein.

The plastic extrusion die flow control apparatus A-3 of FIG. 3 functions in performance of the process concepts substantially in the same manner as was earlier described in connection with the forms of the invention shown in FIGS. 1 and 2. The accumulator 54 receives melt from the stream when the die output needs to be reduced, and delivers melt to the stream when die output needs to be increased. In this manner, changes can be effected in what conventionally is an essentially steady-state device. However, with particular reference to the embodiment of the invention shown in FIG. 3, this apparatus A-3 is of significance should it be desired to apply indicia to the product, as for marking the product as to source of origin. Intermittent stripes or like indicia may be conveniently applied in this manner.

Figure 4:
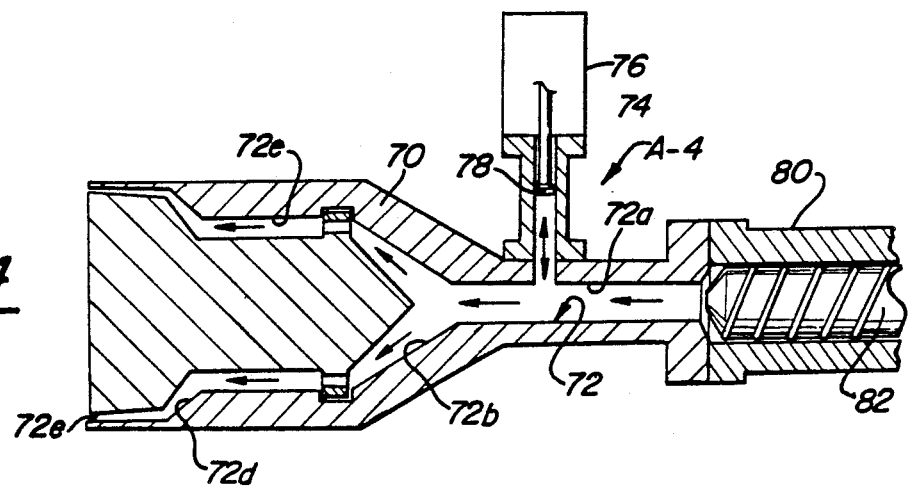
FIG. 4 is a vertical sectional view of an extrusion die, extruder, and accumulator means, illustrative of one location of the latter means in association with a bridge type extrusion die.

Referring now to FIG. 4 of the drawings, there is shown a variable volume device or accumulator means in association with an extrusion die of the bridge type. Again, in the manner of the forms of the invention described hereinabove, the structural embodiment shown in FIG. 4 is effective to receive or discharge melted thermoplastic resin, and thereby produce a variance in the output of the extrusion die, so as to control the thickness of predetermined portions of the extruded product.

Plastic extrusion die output control apparatus of FIG. 4 is designated generally therein by the legend A-4 and comprises an extrusion die member 70 interiorly passaged as at 72. The material flow passage 72 is formed by a main portion 72a communicating with a divergent portion 72b which connects with an annular portion 72c communicating with a second divergent portion 72d, which termiantes in annular die orifice 72e. It will be appreciated that the specific configuration of the melt flow passage 72 is exemplary only, and that variations therein may be effected without departing from the novel process concepts of the present invention.

Supported by the exterior of the extrusion die member 70 is accumulator means 74 taking the form of cylinder means 76 and piston means 78 movable therein. It is to be noted that the accumulator means 74 is located so as to discharge melt into and receive melt from main portion 72a of melt flow passage 72, and that melt is fed into said passage 72 from extruder 80 under action of feed screw means 82 therein.

The embodiment of applicant's invention shown in FIG. 4 incorporates the process concepts earlier described in connection with FIGS. 1, 2 and 3, and accordingly, a detailed description of the method directed to FIG. 4 is not believed necessary. As previously noted, in all forms of the invention the accumulator means 16, 36, 54 or 74 receives melt from the stream when die output needs to be reduced, and delivers melt to the stream when die output needs to be increased. The output of an otherwise essentially steady-state device is thereby changed or varied.

Figure 5:
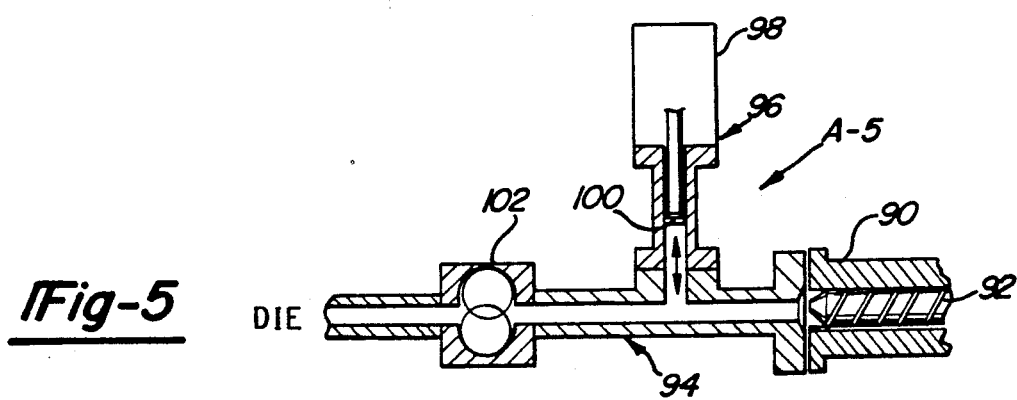
FIG. 5 is a vertical sectional view of an extruder, variable speed melt pump means, and accumulator means, illustrative of another embodiment of the present invention.

It is also within the purview of the present invention to employ accumulator means in combination with a variable speed melt pump, for the novel purpose of varying the output of a plastic extrusion die. A structural arrangement disclosing this inventive combination is shown in FIG. 5, to which reference is now made. Plastic extrusion die flow control apparatus is designated generally therein by the legend A-5, and comprises an extruder 90 having feed screw means 92 operable therein, forcing melt into flow control member 94 supporting thereon accumulator means 96 provided by cylinder means 98 having piston means 100 movable therein. Connected to flow control member 94 is variable speed controlled melt pump means 102 directing a variable volume of melt to extrusion die (not shown).

As appears in FIG. 5, variable volume device or accumulator means 96 is located between extruder 90 and variable speed melt pump means 102 to control volume changes to the pump means, thereby varying the output of the extrusion die downstream. As previously described in connection with the other views of the drawings, by provision of accumulator means supported by the extrusion die, or by means defining a passage leading thereto, variation in the output of a continuously operating extrusion die is accomplished in a manner heretofore not known to the art of which applicant is aware. The accumulator means is a variable volume device, which illustratively is provided by cylinder-piston structure, and thermoplastic resin as the working medium is received from or delivered to the melt stream in accordance with the wall thickness specifications of the plastic extrusion, whether it be corrugated plastic tubing, plastic containers, or profiles of other types wherein occasional thickening or thinning is required.

Systems for controlling action of the accumulator means in accomplishment of the novel purposes of this invention may of course be widely varied, and any one of these will be readily apparent to a person skilled in the art now having the benefit of the foregoing disclosure. An illustrative control system operable with the various forms of apparatus described herein may embody a power source exemplified by hydraulic means responsive to position sensors, which may be limit switches or proximity detectors. Such sensing means may be responsive to shaft rotation on the forming machine, thereby actuating the accumulator means in predetermined fashion so as to deliver melt to the stream or remove melt therefrom, as required.

Various changes and modifications to the present invention have been described herein, and these and other changes may of course be effected without departing from the spirit of the invention or the scope of the subjoined claims.

I claim:

1. A method of controlling the wall thickness of a corrugated thermoplastic extruded profile, comprising directing a continuously moving stream of molten thermoplastic material into an extrusion die having an orifice formed therein, and delivering into or removing from the continuously moving stream variable volumes of molten thermoplastic material to thereby vary the volume of thermoplastic material issuing from the die orifice, resulting in control over the wall thickness of the extruded corrugated profile.

2. A method of varying the output of a plastic extrusion die and thereby the wall thickness of a corrugated thermoplastic extruded profile issuing therefrom, comprising directing a continuously moving stream of molten thermoplastic material into an extrusion die and along a toroidal path therein, and without interrupting the continuous movement of said stream, introducing thereinto or withdrawing therefrom variable volumes of thermoplastic material to thereby vary the die output and wall thickness of the corrugated profile extruded from the die.

3. A method of varying the output of a plastic extrusion die as defined in claim 2, in which variable volumes of thermoplastic material are introduced or withdrawn from the continuously moving molten stream essentially simultaneous with direction of said stream into the extrusion die.

4. A method of varying the output of a plastic extrusion die as defined in claim 2, in which a pumping action is applied to the continuously moving stream intermediate the point at which the molten stream is directed into the die and the point at which variable volumes of material are introduced or withdrawn.

5. A method of controlling the wall thickness of predetermined portions of a corrugated plastic extrusion, comprising continuously introducing a constant volume of molten thermoplastic material into an extrusion die along a continuous free flow path from the extruder to said die, thereby providing through said die a continuously moving molten stream which includes said constant volume introduced, and without interrupting the continuous movement of said stream, delivering to or removing from said stream variable volumes of molten thermoplastic material, depending upon whether die output needs to be increased or decreased so as to control the wall thickness of predetermined portions of the corrugated plastic extrusion.

6. A plastic extrusion thickness control method as defined in claim 5, in which the introducing and delivering or removing steps take place within the extrusion die.

7. A plastic extrusion thickness control method as defined in claim 5, in which the introducing and delivering or removing steps take place outside the extrusion die immediately adjacent an entry thereto.

8. A plastic extrusion thickness control method as defined in claim 5, in which the constant volume and variable volumes of molten thermoplastic are provided by separate sources.

* * * * *